United States Patent Office 3,120,560
Patented Feb. 4, 1964

3,120,560
PURIFICATION OF BIS BETA HYDROXYETHYL TEREPHTHALATE
Max H Keck, Cuyahoga Falls, Ohio, assignor to The Goodyear Tire & Rubber Company, Akron, Ohio, a corporation of Ohio
No Drawing. Filed Mar. 14, 1961, Ser. No. 95,468
5 Claims. (Cl. 260—475)

This invention relates to bis beta hydroxyethyl terephthalate and, more particularly, is concerned with a process for the purification of bis beta hydroxyethyl terephthalate which can be used in the preparation of high molecular weight linear polyesters.

Bis beta hydroxyethyl terephthalate is an intermediate used for the preparation of polyesters used as synthetic films and fibers. It is polymerized under relatively high temperature and vacuum to form synthetic linear polyesters. In order to minimize darkening or the development of color in the polyesters formed under such conditions it is necessary that the bis beta hydroxyethyl terephthalate be free of impurities.

Bis beta hydroxyethyl terephthalate can be prepared by several different methods. For example, the ester can be prepared by the direct reaction of ethylene glycol with terephthalic acid. Another method for the preparation of the ester is by the reaction of dimethyl terephthalate with ethylene glycol under ester interchange conditions in the presence of an ester interchange catalyst. Bis beta hydroxyethyl terephthalate can also be prepared by reacting the disodium salt of terephthalic acid with ethylene chlorohydrin. Another method, and perhaps the most economical and practical method for the preparation of bis beta hydroxyethyl terephthalate, is the method in which an aqueous suspension of terephthalic acid is reacted with ethylene oxide in the presence of an alkaline catalyst. In all of these processes the bis ester prepared contains some of the reactants and/or impurities which are formed by incomplete reaction of the reactants or which are formed by side reactions. For example, in the process in which the bis beta hydroxyethyl ester is formed by the reaction of terephthalic acid with ethylene oxide the product is contaminated with unreacted terephthalic acid, some salts of terephthalic acid, low molecular weight polymeric ethylene glycol and the monobeta hydroxyethyl ester of terephthalic acid.

It is an object of this invention to provide a method for the purification of bis beta hydroxyethyl terephthalate. It is another object of the invention to provide a bis beta hydroxyethyl terephthalate which can be polymerized to form a high molecular weight polymer having little or no color or discoloration.

The practice of the invention is illustrated by the following example: Crude bis beta hydroxyethyl terephthalate prepared by the reaction of ethylene oxide with terephthalic acid in aqueous suspension in the presence of an alkaline catalyst and containing at least some of the impurities listed above is dissolved in from 3 to 5 times its weight of ethylene dichloride at refluxing temperature. The resulting solution is filtered while still hot (above 75° C.) to remove the insoluble half-ester, mono beta hydroxyethyl terephthalate, and other impurities. The solution is allowed to cool. Bis beta hydroxyethyl terephthalate crystallizes. The crystals are filtered from the solvent and washed with fresh solvent to remove any impurities remaining on the surface of the crystals. The product is then dried when it is ready for use in the preparation of polyesters.

The above method can be modified when the bis glycol ester appears to be unusually dark or high in color to provide for treatment of the solution of the bis beta hydroxyethyl ester with activated charcoal to remove color. This is accomplished by treating the hot solution with from about 1 to about 5 percent by weight of decolorizing charcoal, based on the weight of bis beta hydroxyethyl terephthalate, and then filtering to remove the charcoal. The clear solution is then cooled and bis beta hydroxyethyl terephthalate crystallizes. The crystals are removed from the solution by filtration, washed, and dried.

The improvement in polymer color obtained by purifying bis beta hydroxyethyl terephthalate prepared by the reaction of terephthalic acid with ethylene oxide by crystallizing it from ethylene dichloride as compared with the method in which the bis ester was purified from water is clearly shown by comparing the color of polymer produced in each case using bis beta hydroxyethyl terephthalate purified by the different methods. The polymers listed in Table I were prepared as follows:

EXAMPLE

A mixture of 40 grams of bis beta hydroxyethyl terephthalate, 0.009 gram of zinc acetate, and 0.009 gram of antimony trioxide was heated at 197° C. for 30 minutes under nitrogen atmosphere. The temperature of the mixture was then raised to 244° C. and held there for 15 minutes. The temperature was then maintained at 244° C. while the pressure was reduced from atmospheric pressure to 0.03 millimeter of mercury pressure over a period of 15 minutes. The temperature was then raised to 280° C. and maintained at this level for 45 minutes under 0.03 millimeter of mercury pressure. A very viscous, clear, light-colored polymer was obtained. The polymer color was rated 0.5 on a color comparison scale. The intrinsic viscosity was 0.881 measured at 30° C. in a 60:40 s-tetrachloroethane:phenol mixture (60 parts by weight of s-tetrachloroethane/40 parts by weight of phenol).

The purification treatment and the color of polymer produced from the bis esters so purified are tabulated in Table 1 below:

Table 1

| Bis glycol terephthalate: | Polymer color |
|---|---|
| No purification | 3 |
| Crystallized from water | 1 |
| Crystallized from ethylene dichloride | .5 |
| Crystallized from ethylene dichloride after charcoal treatment of the solution | Below .25 |

The invention has been illustrated with respect to the use of ethylene dichloride as the solvent for purifying the bis ester. Other chlorinated solvents can also be used. Examples of such solvents are s-tetrachloroethane and 1,2-propylene dichloride.

It is obvious that the temperature used in the process will depend on the solubility of the bis ester in the solvent as well as the temperature at which the bis ester crystallizes from solution. For example, bis beta hydroxyethyl terephthalate is quite soluble in ethylene dichloride at the reflux temperature (83° C.). However, the ester crystallizes from ethylene dichloride solution at a temperature of from about 70 to 75° C. Therefore, when it is desirable to filter the solution before the ester crystallizes to remove insoluble matter or when charcoal is used in the added purification step, the filtration must be carried out at a temperature somewhat above 75° C. which is just below the reflux temperature of the mixture with the ethylene dichloride used as a solvent.

When s-tetrachloroethane is used as a solvent the mixture will not usually be heated to refluxing temperature because bis hydroxyethyl terephthalate melts at a temperature well below the boiling point of s-tetrachloroethane. It is most convenient then to heat the solvent-ester mixture to a temperature somewhat below the melting point of the bis hydroxyethyl terephthalate (111° C.) to dissolve the bis ester and then filter the hot solution to remove insoluble matter. After being filtered the solution is cooled to allow the bis beta hydroxyethyl terephthalate to crystallize and the bis ester is recovered by filtration or other suitable means.

The process is usually carried out at atmospheric pressure. The pressure can be varied, if desired. For example, the bis ester can be dissolved and filtered under pressure using suitable pressure vessels and pressure filters. It is obvious that the operating temperature will be adjusted with the pressure used. The ratio of solvent to bis hydroxyethyl terephthalate can be varied over a wide range. From 2 to 15 or more parts of solvent based on the bis ester can be used. The amount generally used will be from 3 to 10 parts of solvent per part of bis hydroxyethyl ester.

While certain representative embodiments and details have been shown for the purpose of illustrating the invention, it will be apparent to those skilled in this art that various changes and modifications may be made therein without departing from the spirit or scope of the invention.

I claim:

1. The process which comprises dissolving crude bis beta hydroxyethyl terephthalate in a hot solvent selected from the group consisting of ethylene dichloride, s-tetrachloroethane, and 1,2-propylene dichloride, filtering the solution and then cooling and allowing the bis beta hydroxyethyl terephthalate to crystallize and removing it from the solvent.

2. The process of claim 1 in which the bis beta hydroxyethyl terephthalate is dissolved in at least 3 times its weight of the solvent at refluxing temperature and then the solvent is cooled and the bis beta hydroxyethyl terephthalate allowed to crystallize.

3. The process of claim 1 in which the solvent used is ethylene dichloride.

4. The process of claim 1 in which the solvent used is 1,2-propylene dichloride.

5. The process of claim 1 in which the solvent used is 1,1,2,2-tetrachloroethane.

References Cited in the file of this patent

UNITED STATES PATENTS 3,008,981   Vaitekunas _____ Nov. 14, 1961

FOREIGN PATENTS 429,915   Great Britain _____ June 11, 1935
799,059   Great Britain _____ July 30, 1958

OTHER REFERENCES

Vogel: A Textbook of Practical Organic Chemistry (New York, 1957), pages 122–127.